(12) United States Patent
Xu et al.

(10) Patent No.: US 9,405,724 B2
(45) Date of Patent: Aug. 2, 2016

(54) RECONFIGURABLE APPARATUS FOR HIERARCHICAL COLLECTIVE NETWORKS WITH BYPASS MODE

(71) Applicant: Intel Corporation, Santa Clara, CA (US)

(72) Inventors: Jianping Xu, Portland, OR (US); Asit K. Mishra, Hillsboro, OR (US); Joshua B. Fryman, Corvallis, OR (US); David S. Dunning, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 405 days.

(21) Appl. No.: 13/930,976

(22) Filed: Jun. 28, 2013

(65) Prior Publication Data

US 2015/0006849 A1     Jan. 1, 2015

(51) Int. Cl.
*G06F 9/30*     (2006.01)
*G06F 15/173*     (2006.01)

(52) U.S. Cl.
CPC ................ *G06F 15/17325* (2013.01)

(58) Field of Classification Search
None
See application file for complete search history.

(56) References Cited

U.S. PATENT DOCUMENTS

| | | | | |
|---|---|---|---|---|
| 5,928,351 A | * | 7/1999 | Horie et al. | 712/11 |
| 7,444,385 B2 | * | 10/2008 | Blumrich et al. | 709/217 |
| 7,650,434 B2 | * | 1/2010 | Blumrich et al. | 709/252 |

* cited by examiner

*Primary Examiner* — Corey S Faherty
(74) *Attorney, Agent, or Firm* — Carrie A Boone PC

(57) ABSTRACT

A reconfigurable tree apparatus with a bypass mode and a method of using the reconfigurable tree apparatus are disclosed. The reconfigurable tree apparatus uses a short-circuit register to selectively designate participating agents for such operations as barriers, multicast, and reductions. The reconfigurable tree apparatus enables an agent to initiate a barrier, multicast, or reduction operation, leaving software to determine the participating agents for each operation. Although the reconfigurable tree apparatus is implemented using a small number of wires, multiple in-flight barrier, multicast, and reduction operations can take place. The method and apparatus have low complexity, easy reconfigurability, and provide the energy savings necessary for future exa-scale machines.

21 Claims, 14 Drawing Sheets

US 9,405,724 B2

RECONFIGURABLE APPARATUS FOR HIERARCHICAL COLLECTIVE NETWORKS WITH BYPASS MODE

TECHNICAL FIELD

This application relates to barrier, multicast, and reduction operations in high-performance computing.

BACKGROUND

In large-scale parallel machines, a common operational requirement is for barrier synchronizations—stopping all cores participating in the barrier until every core reaches the barrier, and then releasing the barrier such that all cores may proceed. Other types of such collective network operations include multi-cast/broadcast support and reduction operations, in situ or otherwise.

Fundamentally, one approach to the barrier/multicast/reduction (BMR) problem is to create BMR libraries via software constructs (trees, global variables, etc.) or hardware support. This approach typically includes significant overhead in design complexity as well as execution sequences for atomic support, cache bounces, etc. Alternately, some machines provide dedicated hardware inside existing on-die and off-die interconnects, cores, or both, typically represented as a special type of protocol inside existing networks.

The advantage to the hardware solution to BMR sequences is the greatly reduced amount of memory traffic and lower latency, both of which can lead to significant energy savings in large-scale machines. The advantage to the software solution is that additional legacy is not introduced to the machines, nor will the software solution fail to work on some machines that may not provide some or all hardware BMR features.

In either approach, there is a substantial complexity in supporting flexible BMR systems, either through software implementation and validation or through reconfigurable protocol designs inside existing physical networks. The need for configurability stems from the division of work across large machines, such that only a fraction of distributed agents are likely participating in any given barrier synchronization.

Thus, there is a continuing need for a new scheme for implementing barrier, multicast, and reduction operations.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a reconfigurable tree apparatus with a bypass mode and a method of using the reconfigurable tree apparatus are disclosed. The reconfigurable tree apparatus uses a short-circuit register to selectively designate participating agents for such operations as barriers, multicast, and reductions (BMR operations). The reconfigurable tree apparatus enables an agent to initiate a barrier, multicast, or reduction operation, leaving software to determine the participating agents for each operation. Although the reconfigurable tree apparatus is implemented using a small number of wires, multiple in-flight barrier, multicast, and reduction operations can take place. The method and apparatus have low complexity, easy reconfigurability, and provide the energy savings necessary for future exa-scale machines.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
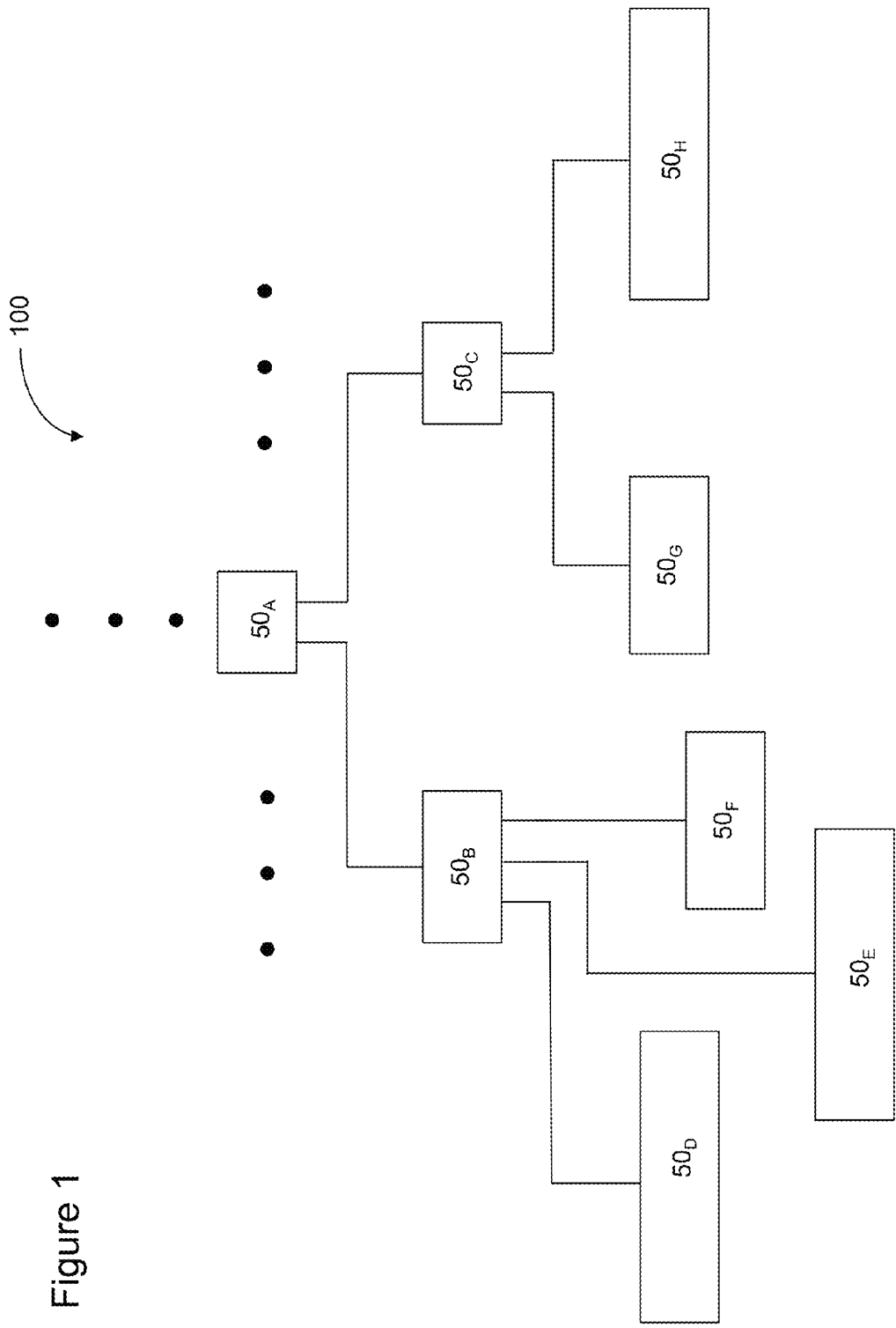
FIG. 1 is a simplified block diagram of a reconfigurable tree apparatus, according to some embodiments.

FIG. 1 is a simplified block diagram of a reconfigurable tree apparatus 100, according to some embodiments. The tree apparatus 100 is a simplified illustration of a hierarchical collective network. Hierarchical collective networks consist of interconnected members or entities, such as agents or cores. Collective networks are designed to manage collective communications in parallel high-performance computing. Collective communication primitives include barrier, reduction, broadcast, and multicast operations, etc. Collective networks may be specialized (dedicated) networks or may exist within data networks.

At the top of the hierarchy are "parent" members and lower hanging members are known as "child" members. "Parent" and "child" are relative terms, and a parent member of the hierarchy may also be a child of different member of the hierarchical collective network, and vice-versa. The tree apparatus 100 is used herein to illustrate how barrier, multicast, and reduction operations may be performed in an agent network, as described further below. Nevertheless, the principles described herein may similarly be applied to other types of hierarchical collective networks.

The reconfigurable tree apparatus 100 consists of support circuits 50A-50H (collectively, "support circuits 50"), which are connected to one another. The reconfigurable tree apparatus 100 is disposed along with other circuitry of a computing system having multiple agents. As is illustrated below, each support circuit 50 of the reconfigurable tree apparatus 100 supports a distinct block of the multiple-agent computing system. The size of each support circuit 50 is based on the number of agents within each block, as described in more detail below.

The reconfigurable tree apparatus 100 describes an in-network computing and synchronization paradigm whereby multiple participating agents (compute and memory engines) can collaboratively perform barrier operations, reduction operations, and multicast operations. Specifically, the reconfigurable tree apparatus 100 employs an implementation strategy for software (program) synchronization primitives like barrier instructions, delivery of data/information to multiple participating agents through the network using multicast operations, and in-network compute instructions like reduction operations. Furthermore, in some embodiments, a distinct reconfigurable tree apparatus 100 may be implemented from within an agent rather that in the network directly.

In some embodiments, the implementation strategy of the reconfigurable tree apparatus 100 is to use a few wires in the control plane of an existing data bus and/or switch to (1) initiate the operations (by each agent) and (2) implement the decision logic of each operation in a bus or switch arbiter. The reconfigurable tree apparatus 100 described herein can be implemented using a shared bus, an interconnect constructed out of switches, or a combination using both buses and switches. In the following example embodiments, the reconfigurable tree apparatus 100 and the method of using the apparatus are described in the context of a bus.

The reconfigurable tree apparatus 100 begins as a dedicated single-wire AND-OR tree built from each agent, combining into a tree structure, with two wires looping back into each agent capable of participating in barrier, multicast, or reduction operations. Before discussing these operations in detail, an introduction to the support circuit 50 is appropriate.

Figure 2:
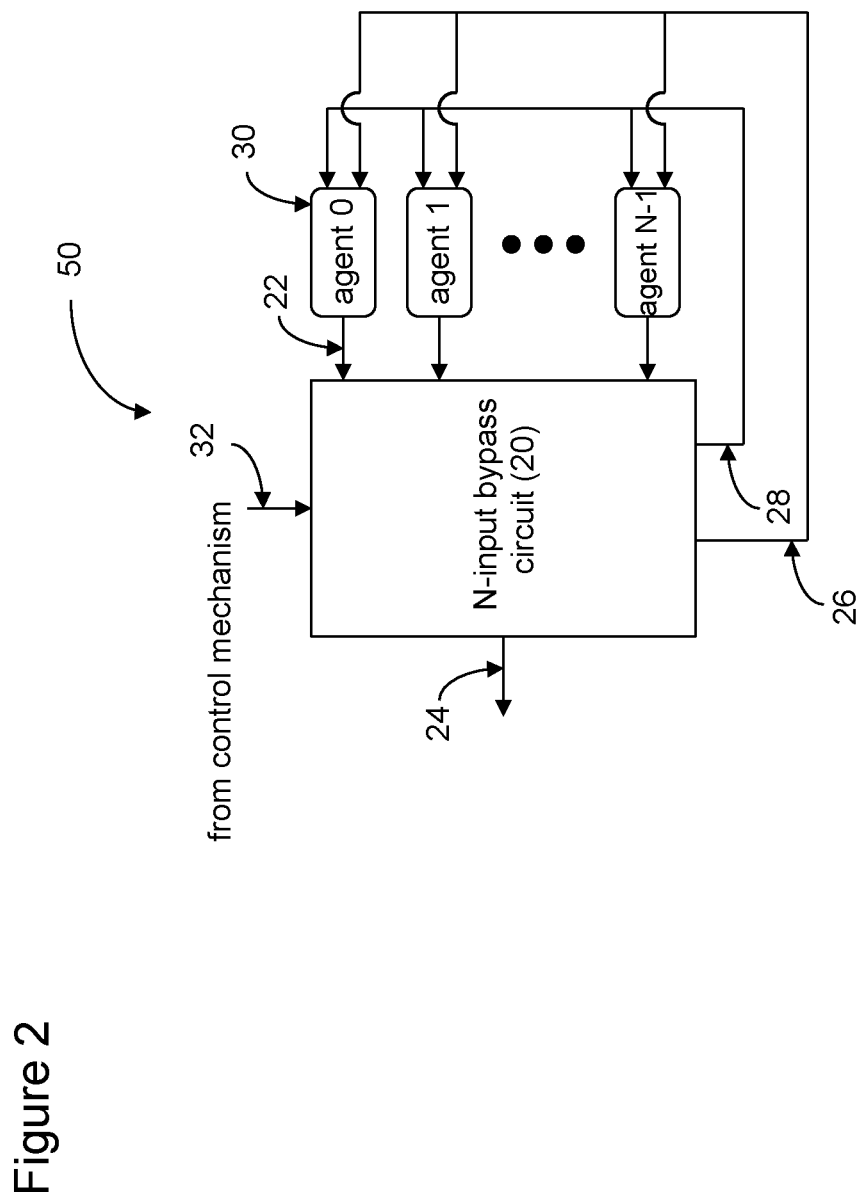
FIG. 2 is a simplified block diagram of a support circuit of which the reconfigurable tree apparatus of FIG. 1 is made, according to some embodiments.

FIG. 2 is a simplified block diagram of the support circuit 50 used in the reconfigurable tree apparatus 100 of FIG. 1, according to some embodiments. The support circuit 50 features an N-input bypass circuit 20 supporting N agents 30, for integer N. The N-input bypass circuit 20 features N signals 22, each one received from a different agent 30, plus a signal 32 to be received from an external control mechanism. The N-input bypass circuit 20 also features an output signal 24, and two feedback signals 26 and 28, with the latter two signals being fed back into each agent 30. As is shown in FIG. 1, the support circuit 50 replicated throughout the reconfigurable tree apparatus 100, which is itself embedded into a multiple-agent network, enabling a simplified control of such complex operations as barriers, multicasts, and reductions, in some embodiments.

Feeding into the support circuit 50, the agents 30 may be any of a variety of hardware components that make up the multiple-agent network. For example, the agents 30 may include processor cores, which are sometimes further divided into control engines or execution engines, or the agents 30 may be cache devices. The agents 30 may include memories, network interface logic, display processors, bus controllers, network routers, switches, media controllers, platform controller hubs, storage controllers, debug agents, and so on. In some embodiments, from the perspective of the support circuit 50, the agent 30 is the smallest unit of concern and, within each block of the multi-agent network, the number of agents determines the size of the support circuit 50.

Figure 3:
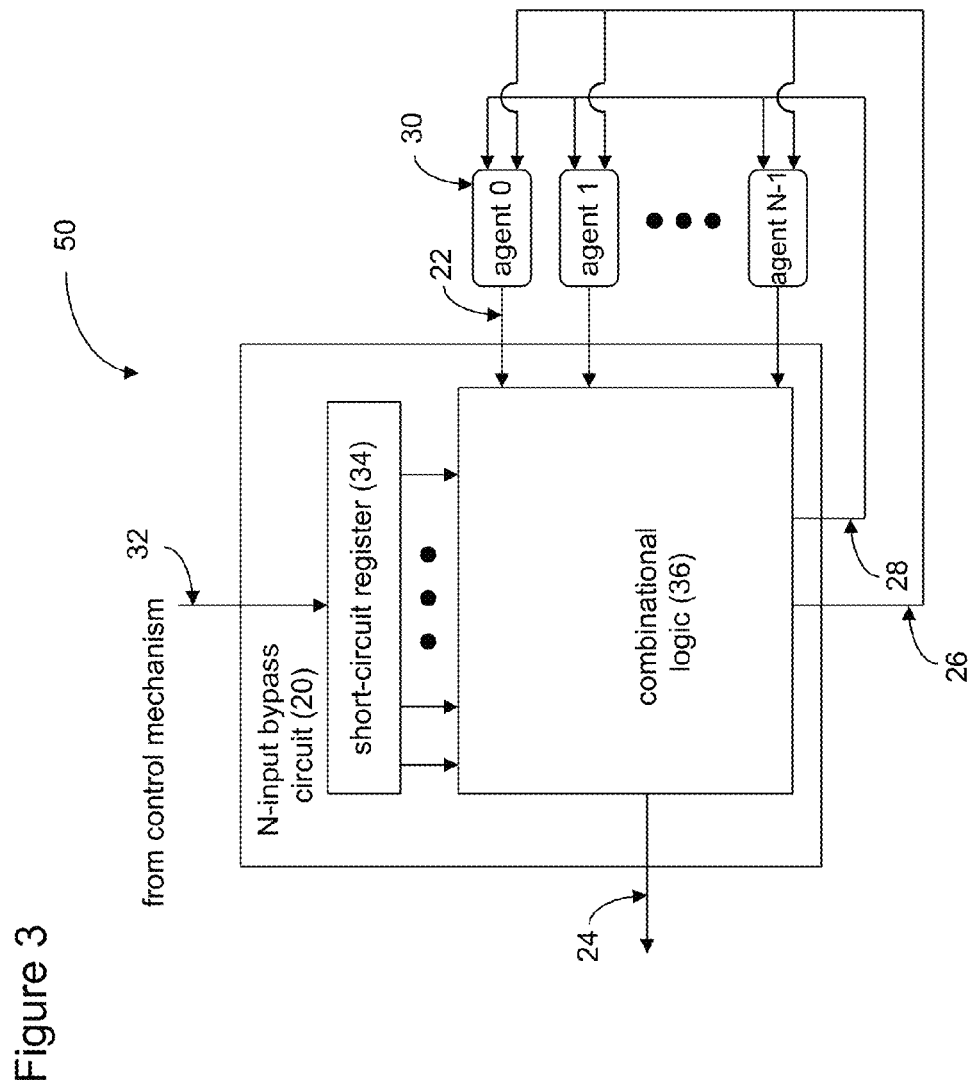
FIG. 3 is a second simplified block diagram of the support circuit of FIG. 2, according to some embodiments.

FIG. 3 is a second simplified block diagram of the support circuit 50 (FIG. 2), which broadly features the components of the N-input bypass circuit 20, according to some embodiments. The N-input bypass circuit 20 includes a short-circuit register 34 and combinational logic 36. The short-circuit register 34 receives the input signal 32 from the external control mechanism. The external control mechanism is discussed in further detail below. Each of the signals 22 received from the agents 30 is fed into the combinational logic 36. Both the feedback signals 26 and 28 generated by the combinational logic 36 are received by each agent 30.

Figure 4:
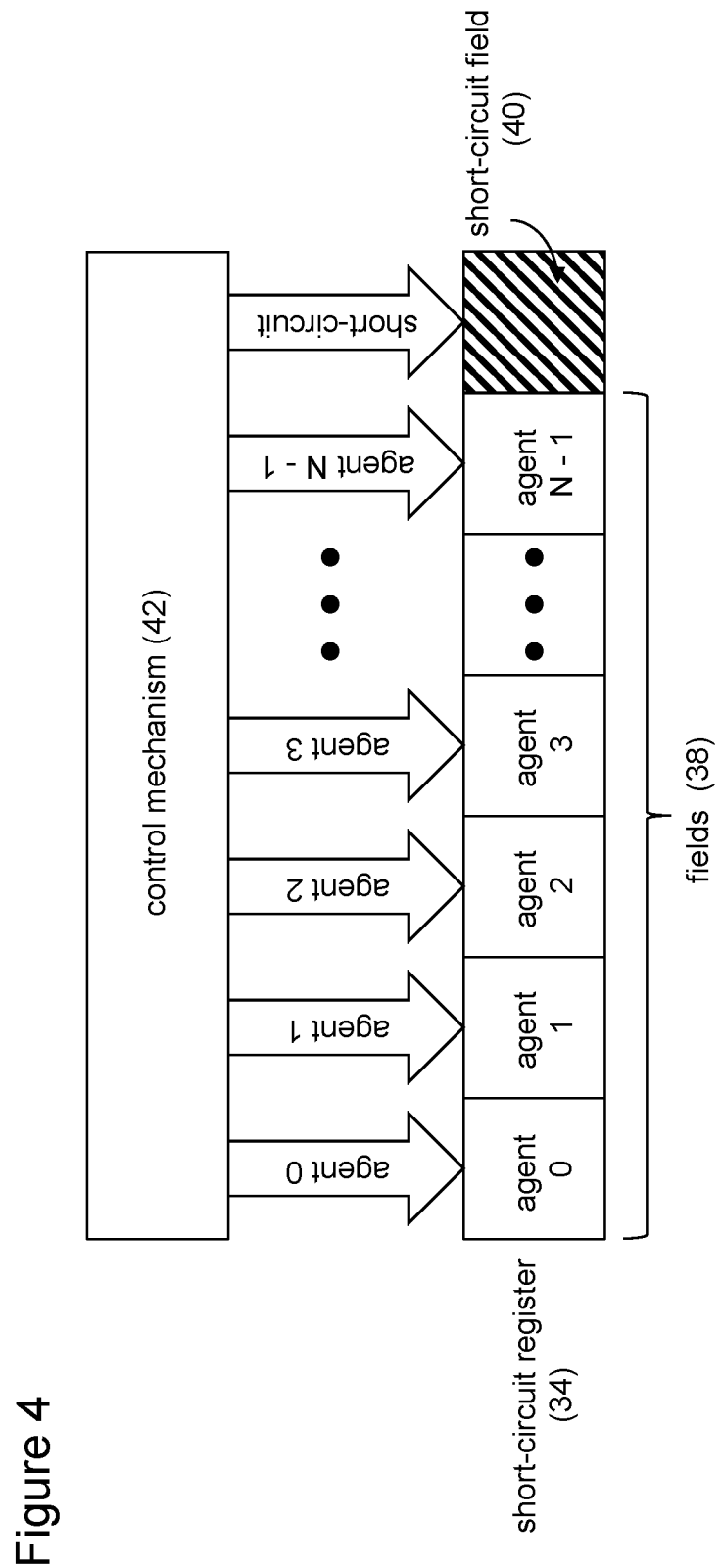
FIG. 4 is a simplified block diagram of the short-circuit register used by the support circuit of FIG. 2, according to some embodiments.

FIG. 4 is a simplified block diagram showing the fields of the short-circuit register 34 of the N-input bypass circuit 20 (FIG. 3), according to some embodiments. The short-circuit register 34 has N+1 fields 38, where N fields are associated with the N agents 30, and one extra field, known herein as the short-circuit field 40 (shown in diagonal stripes) is associated with none of the agents. The short-circuit field 40 is what gives the reconfigurable tree apparatus 100 its bypass capability, in some embodiments.

In some embodiments, the control mechanism 42 controls all fields of the short-circuit register 34. Thus, the control mechanism 42 sets or resets the field 38 associated with each agent 30. The control mechanism 42 also sets or resets the short-circuit field 40. By controlling the short-circuit field 40, the control mechanism 42 is able to substantially bypass the circuitry of the N-input bypass circuit 20, where appropriate, in some embodiments.

Further, in some embodiments, the control mechanism 42 is external to the reconfigurable tree apparatus 100. The external control mechanism 42 is part of existing circuitry of the computing system in which the reconfigurable tree apparatus 100 operates, in some embodiments. The control mechanism 42, as generally described, may consist of one or more circuits of the computing system. The external control mechanism 42 may be a bus arbiter, as one example. The external control mechanism may be a store operation from a processor pipeline, as another example.

Figure 5A:
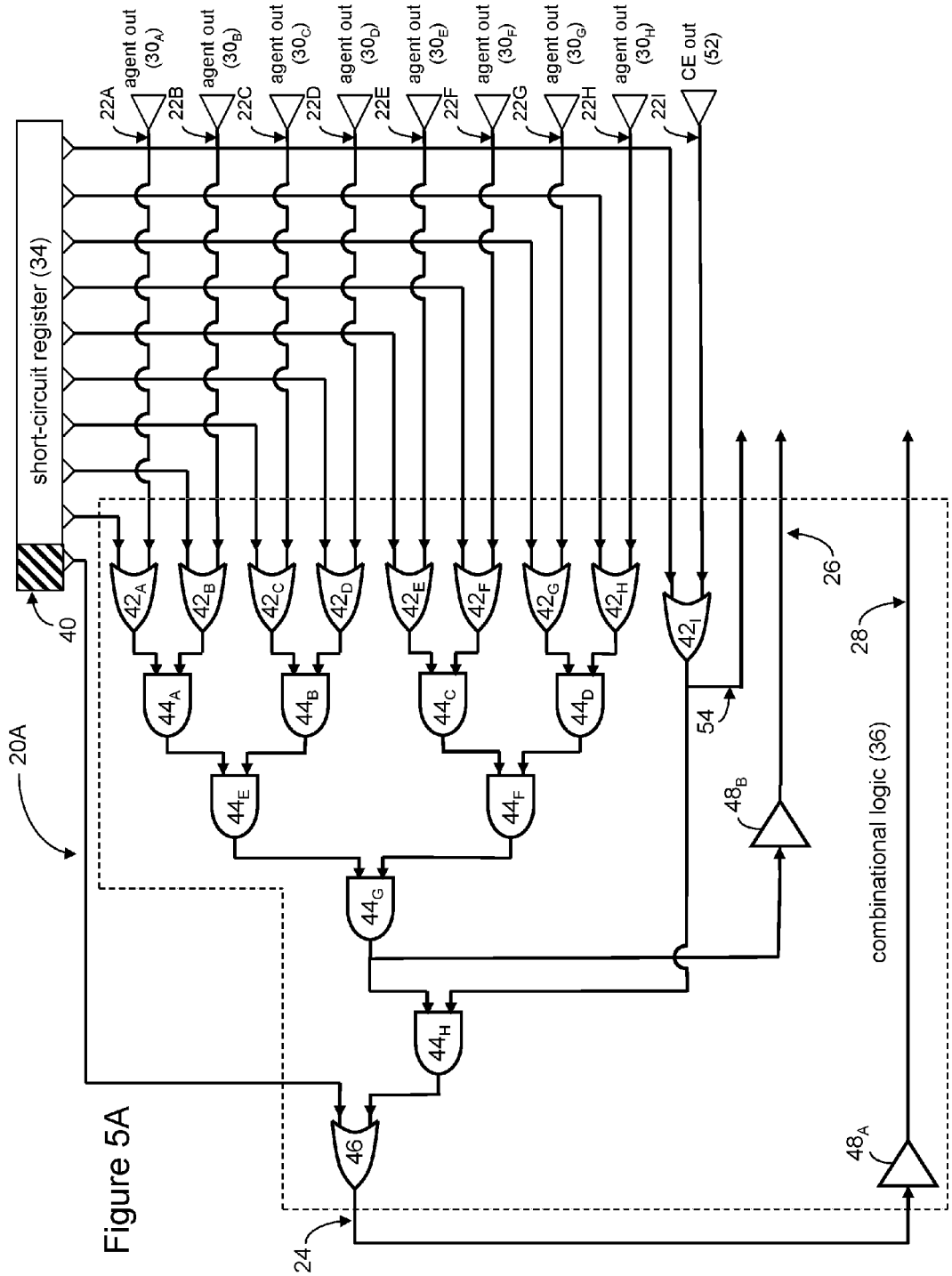
FIGS. 5A and 5B are detailed diagrams of two implementations of the bypass circuit that is part of the support circuit of FIG. 2 and used by the reconfigurable tree apparatus of FIG. 1, according to some embodiments.
Figure 5B:
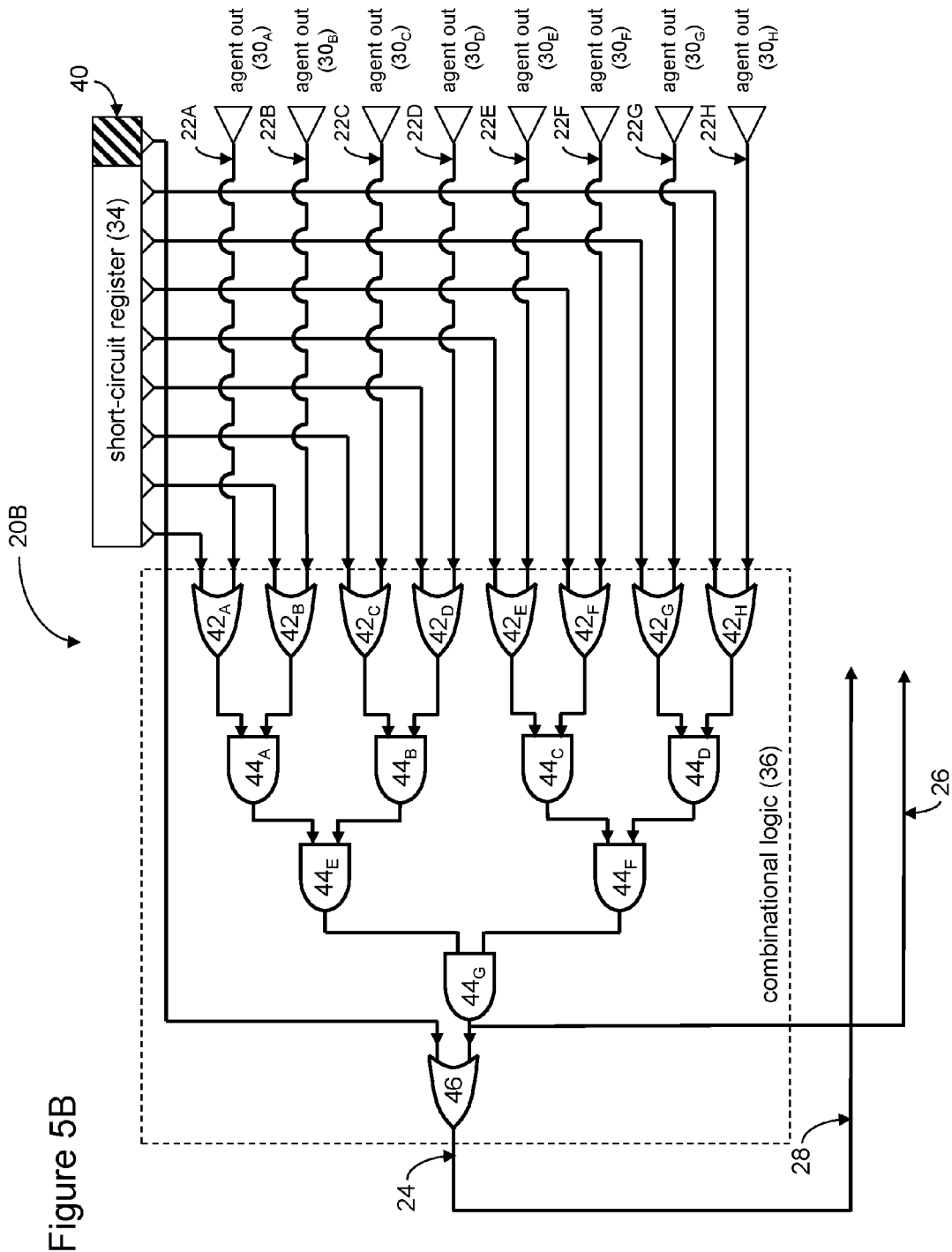

FIGS. 5A and 5B show two possible implementations of the N-input bypass circuit 20 (FIGS. 2 and 3), according to some embodiments. In FIG. 5A, there are eight agents $30_A$-$30_H$ (collectively, "agents 30") sending respective signals $22_A$-$22_H$ (collectively, "signals 22"), plus a control engine (CE) 52 feeding into the combinational logic 36. In FIG. 5B, there are eight agents 30 and no control engine feeding respective signals 22 into the combinational logic 36. System designers of ordinary skill in the art will recognize a number of different implementations of the combinational logic 36 in implementing the support circuit 50. The control engine 52 (FIG. 5A) is to be distinguished from the control mechanism 42 (FIG. 4).

Looking first at FIG. 5A, the short-circuit register 34 includes nine fields 38, one for each agent 30 connected to the combinational logic 36, plus the short-circuit field 40. The combinational logic 36 includes nine two-input OR gates $42_A$-$42_I$ (collectively, "OR gates 42"), eight two-input AND gates $44_A$-$44_H$ (collectively, "AND gates 44"), a final two-input OR gate 46, and two signal repeaters $48_A$ and $48_B$ (collectively, "repeaters 48").

Output signals $22_A$-$22_H$ from respective agents $30_A$-$30_H$, as well as output signal $22_I$ from CE 52 are received into the combinational logic 36. Each OR gate 42 receives one input, a signal 22 from an agent 30, and one input from the respective field of the short-circuit register 34 that is allocated for the agent. Thus, OR gate $42_A$ receives an input signal $22_A$ from agent $30_A$ as well as an input from the respective field 38 of the short-circuit register 34 associated with agent $30_A$.

For each agent 30, whenever either the field 38 associated with that agent or the signal 22 from the agent is a logic high, the associated OR gate 42 produces a logic high output. At the first AND gate stage, once the logic high output is received from two OR gates $42_A$ and $42_B$, the AND gate $44_A$ produces a logic high output. Similarly, once the logic high output is received from both OR gates $42_C$ and $42_D$, $42_E$ and $42_F$, or $42_G$ and $42_H$, the first-stage AND gates $44_B$, $44_C$, and $44_D$, respectively, produce the logic high output. This process continues until all agents 30 generate the logic high value, due to either the agent output signal 22 or the associated agent field 38 of the short-circuit register 34 being set. Eventually, the output signal 24 is generated.

Looking at circuit 20A more closely, however, there is another, shorter, path to getting the output signal 24 activated, namely, by setting the short-circuit field 40 of the short-circuit register 34. This field 40 essentially allows the combinational logic circuit 36 to be bypassed entirely. Since the short-circuit field 40 is connected to an input of the OR gate 46, a logic high output (e.g., the output signal 24) is generated immediately when the short-circuit field is set to a logic high value.

In the circuit 20A, three feedback signals are shown, 26, 28, and 54. These signals are fed back into the agents 30. Signal 26 indicates that all agents 30 that fed into the combinational logic 36 reached a logic high output (whether based on the output signals 22 of the agents 30 or on the agent fields 38 in the short-circuit register 34). Signal 28 is simply the global output signal 24 repeated and fed back to the agents 30. Signal 54 comes from the output of the OR gate $42_I$, which was fed from the control engine 52.

The feedback signal 54 is fed back into the CE agent 52. Because this version of the combinational logic 36 includes a CE agent 52 and an additional feedback signal 54 because the CE agent sometimes does not participate in the same barrier, multicast, or reduction operations as the other agents. Thus, in addition to an external control mechanism 42 being able to bypass the combinational logic 36, the CE agent 52 in this example also is able to assert such bypass control, in some embodiments In some embodiments, because the circuit 20A has multiple feedback signals, the group of agents can participate in their own barrier, multicast, or reduction operation, a "local" BMR operation internally, using feedback signal 26. Simultaneously, the feedback signal 24 may be sent to the remainder of the computing system in which the reconfigurable tree network 100 resides, which indicates to the system that the group of agents 30 in the circuit 20A has satisfied whatever condition is expected in a second, "global" BMR operation.

FIG. 5B is a second implementation of the bypass circuit 20, according to some embodiments. In this circuit, there is no CE out 52 signal coming in and there are instead just eight agents $30_A$-$30_H$ generating eight signals $22_A$-$22_H$. Accordingly, the short-circuit register 34 has eight fields 38, plus the short-circuit field 40. There are eight OR gates $42_A$-$42_H$, six AND gates $44_A$-$44_G$, and a final OR gate 46. Feedback signals 26 and 28 are intended for the agents 30, as in the circuit 20A. As with the circuit 20A, in the circuit 20B, the output signals 22 of the respective agents 30 are coupled with the values in the fields 38 of the short-circuit register 34, and these signals pass through the combinational logic 36 following basic logic rules, with the short-circuit field 40 being available to feed into the OR gate 46 and thus bypass the logic entirely. The short-circuit field 40 is controlled by the external control mechanism 42 (FIG. 4).

Thus, at this first stage of the eight-input bypass circuit 20B, for any given agent, if the short-circuit register 34 has its bit set, the respective OR gate 42 will output a logic high value. This is true whether the output signal 22 of the respective agent 30 is received or not for that agent. Likewise, if the output signal 22 for the respective agent 30 is set, the respective OR gate 42 will output a logic high value, irrespective of whether the short-circuit register 34 bit for that agent is set. Where both the agent bit of the short-circuit register 34 is set and the output signal 22 of the agent 30 is set, the OR gate 42 will output a logic high value. Only where, for a given agent, neither the respective bit of the short-circuit register 34 nor the output signal 22 of the agent 30 is set, will the respective OR gate 42 output be a logic low value.

At succeeding stages, the AND gates 44 act to block the output signal 22 of each agent 30 from proceeding until the other agents are available to proceed. Thus, while agent $30_A$ and agent $30_B$ may each send an output signal $22_A$ and $22_B$ to the circuit 200 quickly, causing the AND gate $44_A$ to output a logic high value, not until both agents $30_C$ and $30_D$ send their output signals $22_C$ and $22_D$ to the circuit 20B will AND gate $44_E$ output a logic high value, and, further, not until agents $30_E$-$30_H$ send their output signals $22_E$-$22_H$ to the circuit will AND gate $44_G$ output a logic high value. In this manner, each stage of the eight-input bypass circuit 20B forces all participating agents (as indicated by the short-circuit register 34) to transmit its respective output signal 22 of the agent 30 through the circuit. Thus, circuit 20B provides a barrier to further processing of the participating agents.

Finally, the AND gate 44G does not release a logic high value to the OR gate 46 until either all of the agents have reached their barrier (or been bypassed via short-circuit) input or the entire-block-bypass field from the short-circuit register 20 is at a logic high value.

FIGS. 5A and 5B represent just two possible implementations of the combinational logic circuit 36 inside the support circuit 50 of the reconfigurable tree apparatus 100. Other embodiments may have three-input logic gates, four-input logic gates, and so on. Further, the number of stages making up the combinational logic circuit 36 may vary, in part, depending on the number of agents being serviced. In some embodiments, the combinational logic circuit 36 provides an energy-delay optimization solution which, depending on the design criteria, may be implemented in a number of different ways.

The implementation of the support circuit 50 first depicted in the reconfigurable tree apparatus 100 of FIG. 1, illustrated in more detail in FIGS. 2 and 3, and as further represented by the detailed logic diagrams of FIGS. 5A and 5B, demonstrate that the reconfigurable tree apparatus 100 is, in some embodiments, a series of single-wire AND trees built from each unit of a larger network, with two wires (the feedback signals 26 and 28) looping back into each agent 30.

In some embodiments, the reconfigurable tree apparatus 100 is to be used as part of an in-network computing and synchronization paradigm whereby multiple participating agents (cores) can collaboratively perform barrier operations, reduction operations, and multicast operations. Specifically, the reconfigurable tree apparatus 100 is part of a larger implementation strategy for software (program) synchronization primitives like barrier instructions, delivery of data/information to multiple participating agents through the network using multicast operations, and in-network compute instructions like reduction operations.

Figure 6:
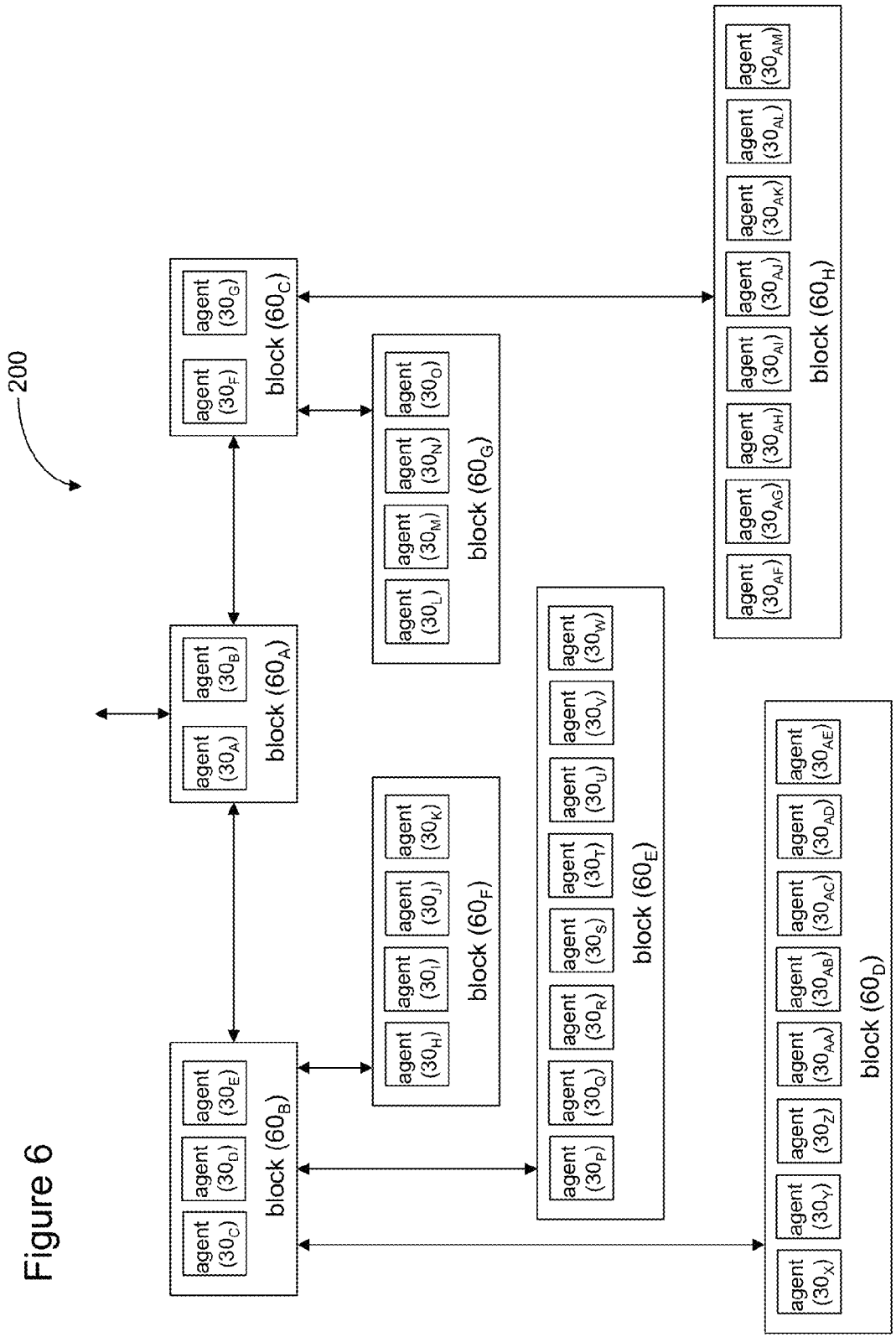
FIG. 6 is a simplified block diagram of a multiple-agent network, according to some embodiments.

FIG. 6 is a simplified diagram a hierarchical collective network 200 according to some embodiments. The network 200 includes eight blocks $60_A$-$60_H$ (collectively, "blocks 60"). Each block 60 includes at least two agents 30. Block $60_A$ includes two agents $30_A$ and $30_B$. Blocks $60_B$ and $60_C$ connect to block $60_A$. Block $60_B$ includes agents $30_C$, $30_D$, and $30_E$. Block $60_C$ includes agents $30_F$ and $30_G$. Block $60_B$ connects to three blocks, blocks $60_D$, $60_E$, and $60_F$. Block $60_D$ includes eight agents $30_X$-$30_{AE}$. Block $60_E$ also includes eight agents $30_P$-$30_W$. Block $60_F$ includes four agents $30_H$-$30_K$. Block $60_C$ connects to two blocks $60_G$ and $60_H$. Block $60_G$ includes agents $30_L$-$30_O$ while block $60_H$ includes agents $30_{AF}$-$30_{AM}$. The network 200 thus has a total of eight blocks 60 and thirty-nine agents 30.

The blocks 60 making up the network 200 of FIG. 6 may be from a single system or multiple systems. For example, the blocks $60_A$, $60_B$, and $60_C$ may reside together on a system board of a single multiprocessor system, while block $60_D$ is a second multiprocessor chip coupled to the system board. Block $60_E$ may be a remote multiprocessor, while block $60_F$ may be a system-on-chip (SoC), and block $60_G$ is a multiprocessor test unit. The components making up the network 200 may reside together on the same system board, or may be distributed as part of a ubiquitous high-performance computing (UHPC) architecture. The blocks may reside in different racks or cabinets of a server or UHPC system, or may reside within one or a few interconnected chips. Nevertheless, the agents 30 making up the network 200 are coupled to one another according to the simplified representation in FIG. 6.

Figure 7:
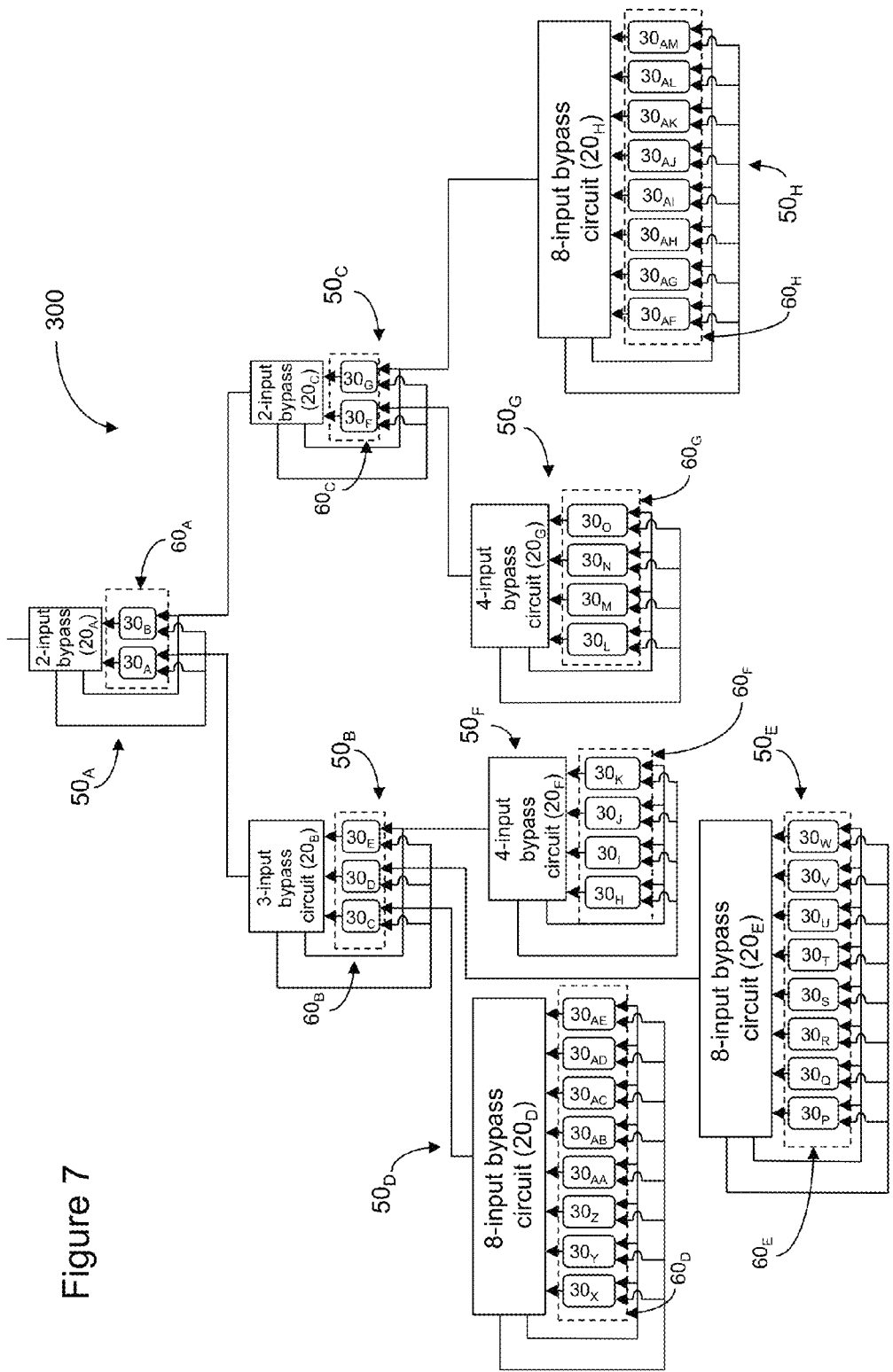
FIG. 7 is a simplified block diagram showing the reconfigurable tree apparatus of FIG. 1 occupying the multiple-agent network of FIG. 6, according to some embodiments.

In some embodiments, the reconfigurable tree apparatus 100 of FIG. 1 may reside in the network 200 of FIG. 6, to support operations such as barriers, multicasts, and reductions (BMR operations). FIG. 7 illustrates a new network supporting barrier, multicast, and reduction operations, known herein as a BMR network 300. The BMR network 300 consists of both the network 200 of FIG. 6 and the reconfigurable tree apparatus 100 of FIG. 1.

In the BMR network 300, the eight blocks 60 (dotted lines) of the network 200 are disposed with the reconfigurable tree apparatus of FIG. 1. For each block 60, there is an appropriately sized support circuit 50 connected to the block. Block $60_A$, which is a two-agent block, includes support circuit $50_A$, which has a two-input bypass circuit $20_A$. Connected to support circuit $50_A$ are support circuits $50_B$ and $50_C$, which service blocks $60_B$ and $60_C$, respectively. Support circuit $50_B$ includes a three-input bypass circuit $20_B$ coupled to each of the three agents $30_C$, $30_D$, and $30_E$ of the block $60_B$, while support circuit $50_C$ includes a two-input bypass circuit $20_C$ coupled to the two agents $30_F$ and $30_G$ of the block $60_C$.

Blocks $60_D$-$60_H$ of the network 200 similarly reside with support circuits $50_D$-$50_H$ in the reconfigurable tree apparatus 100. Support circuit $50_D$ servicing block $60_D$ includes an eight-input bypass circuit $20_D$ for the eight agents $30_X$-$30_{AE}$. Support circuit $50_E$ servicing block $60_E$ also includes an eight-input bypass circuit $20_D$ for the eight agents $30_P$-$30_W$. Support circuit $50_F$ servicing block $60_F$ includes a four-input bypass circuit $20_F$ for the four agents $30_H$-$30_K$. Support circuit $50_G$ servicing block $60_G$ also includes a four-input bypass circuit $20_G$ for the four agents $30_L$-$30_O$. Support circuit $50_H$ servicing block $60_H$ includes an eight-input bypass circuit $20_H$ for the eight agents $30_{AF}$-$30_{AM}$.

In some embodiments, each block 60 in the network 200 includes its own bypass circuit 50 from the reconfigurable tree apparatus 100. Accordingly, each block 60 includes a short-circuit register 34 dedicated to that block, with the short-circuit register having N+1 fields for N agents. N fields of the short-circuit register 34 are associated with an agent 30, while the final field provides the short-circuit 40. Thus, block 60B includes a four-field short-circuit register 34, with one field being reserved as the short-circuit field 40. Block 60H includes a nine-field short-circuit register 34, also with one field being reserved as the short-circuit field 40. The control mechanism 42 controls all fields of the short-circuit register 34, in some embodiments.

Returning to FIG. 3, recall that the support logic 50 of the reconfigurable tree apparatus 100 is connected to N agents 30. Each short-circuit register 30, however, has N+1 inputs, with N inputs being associated with the N agents of the block 60, and the final input being the short-circuit field 40. For each support circuit 50 of the reconfigurable tree apparatus 100, the short-circuit field 40 gives the control mechanism 42 the ultimate authority to bypass the combinational logic 36 on behalf of the agents within the associated block 60. This allows complex operations, such as barriers, multicast, and reduction operations to be globally controlled, efficiently implemented, and reliably executed, in some embodiments.

A unique short-circuit register 34 is thus available from within each bypass circuit 50. The short-circuit register 34 may be software-programmable such that each block 60 may be flexibly controlled. In some embodiments, the short-circuit register 34 operates as a bit-mask, allowing software to control which agents are participating in the BMR network 300 in its present configuration. The short-circuit register 34 may be part of a machine state register of the multiple agent network 200 in which the reconfigurable tree apparatus 100 resides.

In some embodiments, the BMR network 300 extends memory, network, and compute operations together in the system architecture. Further, in some embodiments, the BMR network 300 leverages an existing bus/switch for collaborative compute operations.

FIG. 8 again shows the BMR network 300, this time including control and data buses that support the network. Agents 30A-30H are shown coupled to both a data bus 130 and a control bus 140. The control mechanism 42 is connected also to the data bus 130 and the control bus 140. In some embodiments, the control mechanism 42 is a bus arbiter. Each agent 30 also connects to both the data bus 130 and the control bus 140, through distinct wires, with black bi-directional arrows connecting the agents 30 to the control bus 140 and white bi-directional arrows connecting the agents to the data bus 130. The dotted wires 90A coming from agent 30A, 90B coming from agent 30D, and 90C coming from agent 30F (collectively, "wires 90") are the wires of the reconfigurable tree apparatus 100. In some embodiments, the wires 90 travel through the control bus 140 but not through the data bus 130.

For barrier operations, the data bus 130 is not used. However, for multicast and reduction operations, the data bus 130 is necessary, as these operations include a payload.

In some embodiments, the strategy of using a short-circuit register 34 for all the agents 30 connected to a control mechanism 42 over the control bus 140 may be scaled to include hierarchically connected groups of agents, with each group of agents, in turn, being connected to a local bus. This is illustrated conceptually in FIG. 7, in which blocks 60 of agents 30 are coupled together by lines (which may be thought of as buses). In such a configuration, an additional bit in the short-circuit register 34 at each local control mechanism 42 is used to signify if an agent on the local bus is participating in an on-going barrier spanning across the local bus. Each top-level (global) control mechanism 42 hierarchically keeps track of the on-going barrier operation using the additional bit in the local short-circuit registers 34.

In FIG. 7, and referring also to FIG. 3, the output 24 of each bypass circuit 20 within the support circuit 50 is connected to an agent 30 that is located higher up on the tree of the BMR network 200. The extra bit in the short-circuit register 34, the short-circuit field 40, allows multiple barriers to exist in parallel in this BMR network 300, even though there is only one "wire" of the reconfigurable tree apparatus 100.

Imagine that a barrier is being executed in the BMR network 300 (FIG. 7). The support circuit 50$_D$, for example, can control how it reports up to the support circuit 50$_B$, where the support circuit 50$_B$ is the "parent" of the support circuit 50$_D$. Using the short-circuit field 40, the support circuit 50$_D$ can "short-circuit" how it reports up to the parent support circuit 50$_B$, whether or not the barrier condition has been met in the support circuit 50$_D$. To the entire BMR network 300, as reported back to each block 60, the barrier could be seen as satisfied from the block 60$_D$ even though none of the agents 30$_X$-30$_{AB}$ within the block 60$_D$ did anything about the barrier, simply because the control mechanism 42 (not shown) set the short-circuit field 40 (FIG. 4).

Meanwhile, block 60$_D$, which the control mechanism 42 decided to short-circuit from involvement in the global barrier, can do independent work and ignore what is going on at the global level in the BMR network 300. This keeps the agents 30$_X$-30$_{AB}$ from being stalled needlessly. For example, the block 60$_D$ may want to perform its own local barrier operation, even while the global barrier operation is still taking place. With the short-circuit field 40 asserted to the BMR network 300, the block 60$_D$ may run its own barriers internally, thanks to the feedback signal 26 (FIGS. 5A and 5B), which represents that all participating agents 30$_X$-30$_{AB}$ have reached the barrier (or been short-circuited out of the barrier). Where the support circuit 50 is represented by the diagram 20A in FIG. 5A, where there is a CE 52 in addition to the agents 30, the feedback signal 54 may additionally be used for this purpose, in some embodiments. Put another way, the block 60$_D$ may carve itself out of the global barrier network while appearing to participate, yet still execute its own local barrier operations as much as desired. In some embodiments, the reconfigurable tree apparatus 100, implemented as a single wire connecting through the multiple-agent network 200, is able to represent simultaneously independent, yet concurrent, barriers in any sub-graph of the network. In some embodiments, the BMR network 300 is implemented, not simply using one or two dedicated wires, but as an additional protocol within an existing network.

Thus, the design concept of the reconfigurable tree apparatus 100 is fractal. At each tree branch that is not a leaf node, there is an additional short-circuit register 34, one for each block 60 of the network 200. In some embodiments, the short-circuit register 34 operates at the network connection level, not at the computing agent level. Although the organization of the reconfigurable tree apparatus 100 is fractal, the short-circuit registers 34 for each short-circuit 50 of each block 60 may reside in a central location, in some embodiments.

The reconfigurable tree apparatus 100 thus enables a wide variety of configurations, suitable for barrier, multicast, and reduction operations. For example, looking at FIG. 9, blocks 60$_D$ and 60$_F$ are participating in a first barrier operation (vertical dashed) while blocks 60$_C$ and 60$_G$ are participating in a second barrier operation (horizontal dashed). For the first barrier operation, blocks 60$_B$ and 60$_E$ are configured to indicate that blocks 60$_B$ and 60$_E$ are not participating (short-circuited) while blocks 60$_D$ and 60$_F$ are participating in the barrier operation. Furthermore, block 60$_B$ does not pass its barrier signal up to block 60$_A$. In other words, block 60$_B$ short-circuits itself and the entire network beneath it to the view of block 60$_A$.

For the second barrier operation, blocks 60$_C$ and 60$_G$ are participating. Blocks 60$_C$ and 60$_H$ are configured to indicate that block 60$_H$ is not participating but block 60$_G$ is participating in the barrier operation. The value of block 60$_G$, joins the value computed inside block 60$_C$, thus the barrier is fully resolved in block 60$_C$. Similar to block 60$_B$, block 60$_C$ is configured to not relay its barrier result to block 60$_A$.

Since block 60$_C$ is participating in the barrier computation itself, as the "highest" node in the barrier tree, block 60$_C$ resolves the final status of the barrier. By contrast, in the barrier operation (vertical dashed), blocks 60$_D$ and 60$_F$ are participating in a barrier that lacks a central shared node (block 60$_B$). So, for the first barrier operation, blocks 60$_B$ and 60$_E$ short-circuit themselves out (as non-participating blocks), while blocks 60$_D$ and 60$_F$ relay their signals up the tree to block 60$_B$. In this instance, the barrier is still "resolved" at block 60$_B$, even though block 60$_B$ does not directly participate in the local barrier operation (vertical dashed).

Thus, blocks 60$_F$ and 60$_D$ can jointly operate their own shared barrier, as could blocks 60$_C$ and 60$_G$, simply by configuring their appropriate short-circuit registers to not isolate themselves from the BMR network 300. Instead, the network-level node shared above blocks 60$_F$ and 60$_D$ handles that problem, and blocks 60$_C$ and 60$_G$ only see a "global" barrier that includes each other and no one else.

Once the barrier is resolved at any level, whether at the block level, at the global level, or according to some arbitrary network sub-graph truncation, then, in some embodiments, the result is propagated back to each agent 30 in the BMR network 300.

Figure 9:
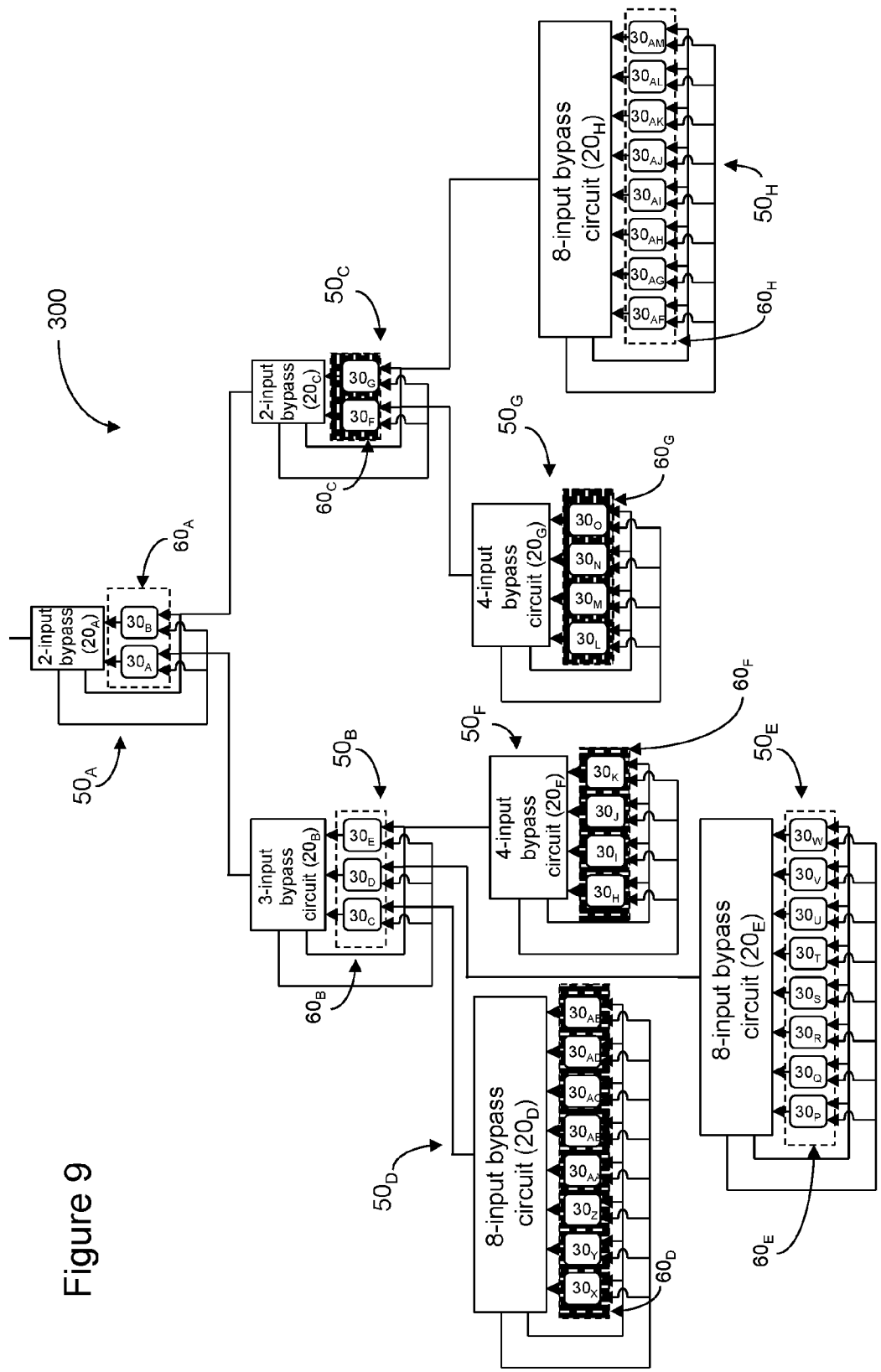
FIG. 9 is a second simplified block diagram showing the reconfigurable tree apparatus of FIG. 1 occupying the multiple-agent network of FIG. 6, according to some embodiments.

Now that the reconfigurable tree apparatus 100 has been shown coupled to a multiple-agent network 200, as represented by the BMR network 300 in FIGS. 7 and 9, an introduction to the barrier network support is appropriate, as this is the basis for also supporting multicast and reduction operations. Following that, collective network operations in the form of a bus network topology are described.

A barrier, as used herein, is a mechanism that, when executed, causes all agents participating in the barrier to cease executing instructions until the barrier mechanism has completed. The reasons for barrier instructions are many and are beyond the scope of this disclosure. An agent may initiate a barrier. Once initiated, a barrier operation is known as an in-flight barrier or an in-flight barrier instruction. Although this disclosure may refer to a single barrier instruction, barrier signal, or barrier operation, generally speaking, a barrier operation may consist of a number of instructions. Once a barrier operation is completed, a barrier output signal will be sent to all participating agents, which lets the agents know they are free to begin execution again, including the issuance of a new barrier instruction.

In some embodiments, only one timing constraint is applied to the BMR network 300, and that is contained to the delivery of a barrier signal across each junction point in the physical tree. While the timing of the barrier signals to each tree segment may be different, the visibility of the barrier output will occur in the same cycle for all agents 30 within a block 60, in some embodiments. Thus, two tree segments of the BMR network 300 may see the result of the barrier, that is, the barrier output signal, at a different point in time, but all the agents 30 with a given block 60 will see the barrier output signal at the same time. This allows for a highly synchronized execution model. Other design implementations may define different rules for barrier signal delivery.

In terms of functional behavior, the barrier support at each agent 30 can be considered one output signal and one input signal, in some embodiments. The barrier instruction exposed on the BMR network 300 (either directly or via memory-mapped I/O logic) may, in some embodiments, do nothing until it is the oldest instruction and ready for retirement. Because a barrier instruction cannot be initiated until all in-flight barrier operations are completed, the agent 30 initiating a barrier first ensures that there are no in-flight barriers before commencing operation.

In some embodiments, the barrier instruction logic in the agent 30 operates as follows, to ensure that there are no in-flight barriers:

1. Recognize whether the current barrier input is individually "high" or "low" in value. Store the status in a temporary bit.
2. Assert the unit barrier_output signal for that agent.
3. The barrier instruction stalls until the appropriate barrier input has a level edge of asserted (high).
4. The barrier instruction continues to stall, but now deasserts the barrier_output signal.
5. When the barrier input matches the original value observed by the barrier logic (before the prior assertion of this unit's signal), the barrier is considered complete and retires. This allows the short-circuit register 34 to bypass an arbitrary amount of the barrier network tree.

In some embodiments, the barrier instruction is a software program executed by the agent 30. If the software is simply allowed to examine the current level input from the reconfigurable tree apparatus 100, the software may observe a past barrier being satisfied, due to signal propagation over the BMR network 300. Because the BMR network 300 may be large, the state of the previous barrier may not have fully cleared due to this signal propagation. Thus, the above sequence of steps ensures that a new barrier is not commenced until the prior barrier has completed. If no prior barrier result is visible, such as following a cold start, first use, or short-circuited condition, the new barrier will be asserted.

The additional step of buffering the "original" value (which is what the first step, above, is doing) is necessary, in some embodiments, since the short-circuit register 34 is capable of short-circuiting all of the agents 30 within the current block 60. A more traditional approach of simply waiting for the falling edge of the block-local barrier signal is insufficient under that condition, since the barrier response signal may always be true.

The reconfigurable tree apparatus 100 for reconfigurable barriers allows software to partition workloads across the entire agent network 200 such that multiple barriers can be active concurrently. The restriction is that, within sub-graphs of the reconfigurable tree apparatus 100, only some agents 30 can be participating in the same barrier. This reconfigurable tree apparatus 100 can be generalized to N wires, rather than a single wire, allowing for a wide variety of in-flight barrier configurations. Nevertheless, in the single-wire implementation, multiple in-flight barriers are possible, in some embodiments.

This type of reconfiguration support allows for limiting the scope of synchronization travel, software overhead, latency, and energy use. However, the reconfigurable tree apparatus 100 can also be further generalized to allow reconfiguration of other types of network operations, including multicasts and reductions. Both multicast and reduction operations are also significant sources of energy cost if messages are sent places where they are not needed. Accordingly, the reconfigurable tree apparatus 100 provides the ability to limit the scope of multicast and reduction sequences, in some embodiments.

Using the same mechanism of the support circuit 50 being distributed throughout the multiple-agent network 200, the network can be extended to support these other operations. In some embodiments, implementation choices include multiplexing data values across the limited wires of the barrier tree, expanding the barrier tree to be machine-word wide, or having the payload for multicast/reduction operations travel in the existing on-die network infrastructure while the coordination traffic travels on the barrier network.

The following paragraphs describe a bus collective network in the form of bus topology with implementation details of each operation.

Barrier Operation: For the barrier operation, the participating agent may be an agent, such as a core, as described above, or may be a control engine (CE) assigned to a collection of agents participating in the barrier. One example of the latter is found in the ubiquitous high-performance computing (UHPC) architecture, in which a control engine is assigned to a collection of agents. (UHPC is a research program established by the Defense Advanced Research Projects Agency, or DARPA. DARPA is an agency of the United States Department of Defense, which is responsible for the development of new technologies for use by the military.)

Figure 10:
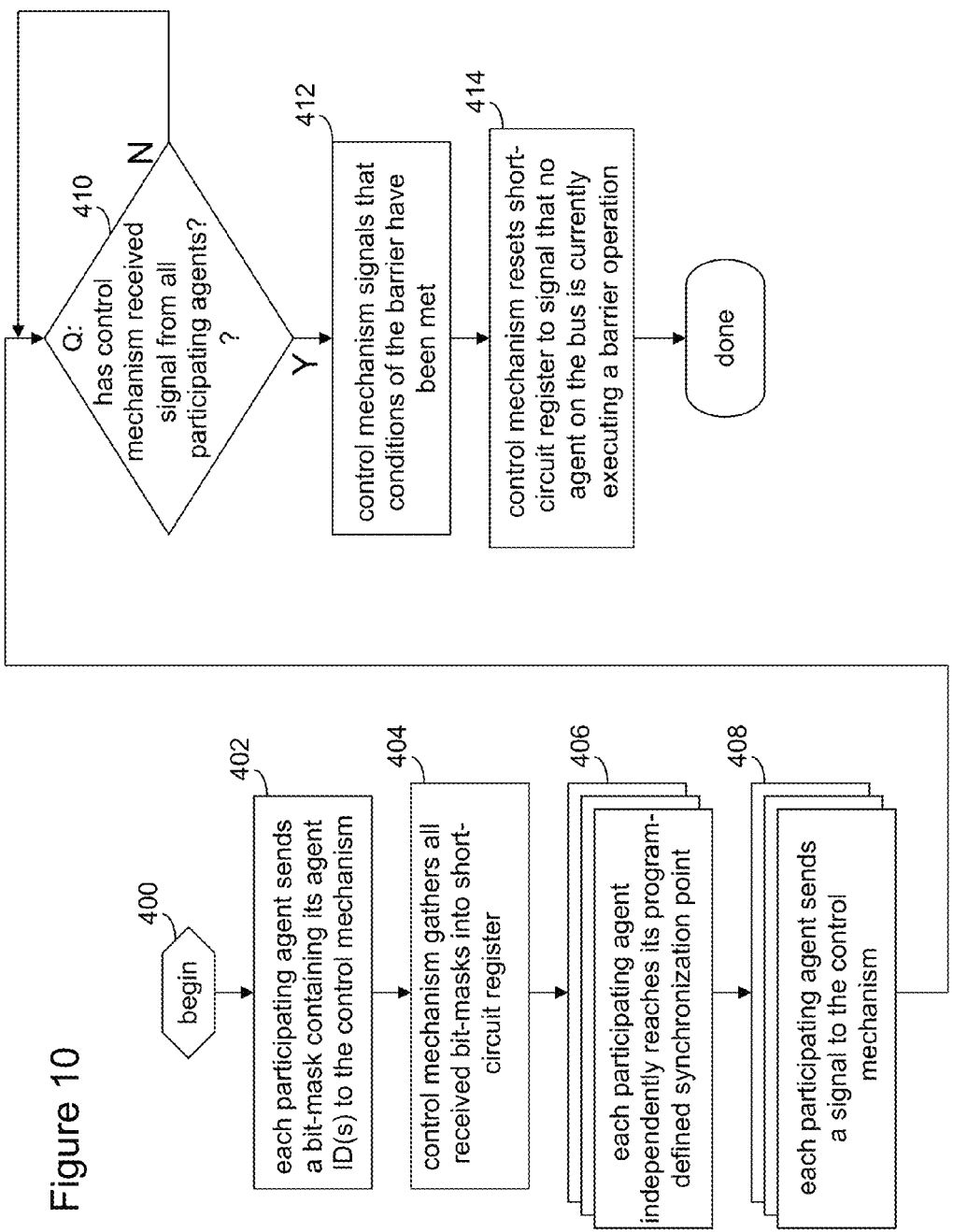
FIG. 10 is a flow diagram showing operations of the BMR network of FIG. 7 in performing barrier operations, according to some embodiments.

The flow diagram of FIG. 10 describes the steps taken by the BMR network 300 in performing the barrier operation, according to some embodiments. With the above understanding of the participating agents in mind, in the barrier operation, each participating agent, whether CE or not, sends a bit-mask containing its own agent identifier or identifiers to the control mechanism 42 (block 402). Where the participating agent is the CE, multiple agent IDs, one for each agent to which the CE is in charge, are sent to the control mechanism 42. The sending of this bit-mask is an asynchronous event and the control mechanism 42 gathers the bit masks from all participating agents into the short-circuit register 34 (block 404). The short-circuit register 34, as described above, then aids the control mechanism 42 in keeping track of all the participating agents to answer further queries, like barrier polling, barrier done, etc., from an agent. After all the participating agents reach their program-defined synchronization point (block 406), the agents send a signal to the control mechanism 42 (block 408). Because steps 406 and 408 are performed by each participating agent, they are symbolically shown in parallel boxes. However, the receipt of the signal by the control mechanism 42 from each participating agent is asynchronous.

Upon receiving this signal from all participating agents (block 410), the control mechanism 42 (1) signals that the conditions of the barrier have been met and (block 412) (2) resets the short-circuit register 34 to signal that no agent on the bus is currently executing a barrier operation (block 414). Once the barrier has been "met" at some level (where the height/depth is defined by the connectivity flow of the network and the short-circuit registers), the result is sent back down to all participating agents so they may know that the barrier was met.

Reduction Operation: Reduction operations in general consume values from each participating agent and generate a result value from all agents. This result value may or may not be multicast back to each agent that contributed to the final value. One example of a reduction operation is a distributed "maximum" operation, where each agent determines the locally maximum value in its data set, and provides this to the reduction operation logic. The network then compares at each network switch the various "maximum" values presented, to find the global maximum for all agents participating. This final maximum value may, in some embodiments, be sent back to all agents that contributed to the determination, or to just one agent that requested the final result.

Returning to FIG. 8, part of the reconfigurable tree apparatus 100 is illustrated in the lines 90 traveling through the control bus 140 as well as the short-circuit register 34. With reduction operations, in addition to the reconfigurable tree apparatus 100 being used, the data plane 130 on the bus is also used to present each agents' local value for the reduction operation, and to broadcast the final reduction operation result back to participating agents. In this case, each participating agent 30, apart from sending its bit-mask, also sends the reduction operation argument to the control mechanism 42. The control mechanism 42 then (1) collects all the participating agents' reduction operation arguments, (2) executes the reduction operation, and (3) broadcasts the result on the bus. The participating agents in turn snoop on the data bus 130 for the result.

For initiating the reduction operation, each agent can instead send its agent-ID bit-mask on another network optimized for small message communication over short distances (e.g., crossbar in the UHPC architecture or a tree-like network). To keep the design simple and leverage the presence of an existing bus, in some embodiments, the reconfigurable tree apparatus 100 uses the control lines 90 on the control bus 140 for reduction operation initiation.

Figure 8:
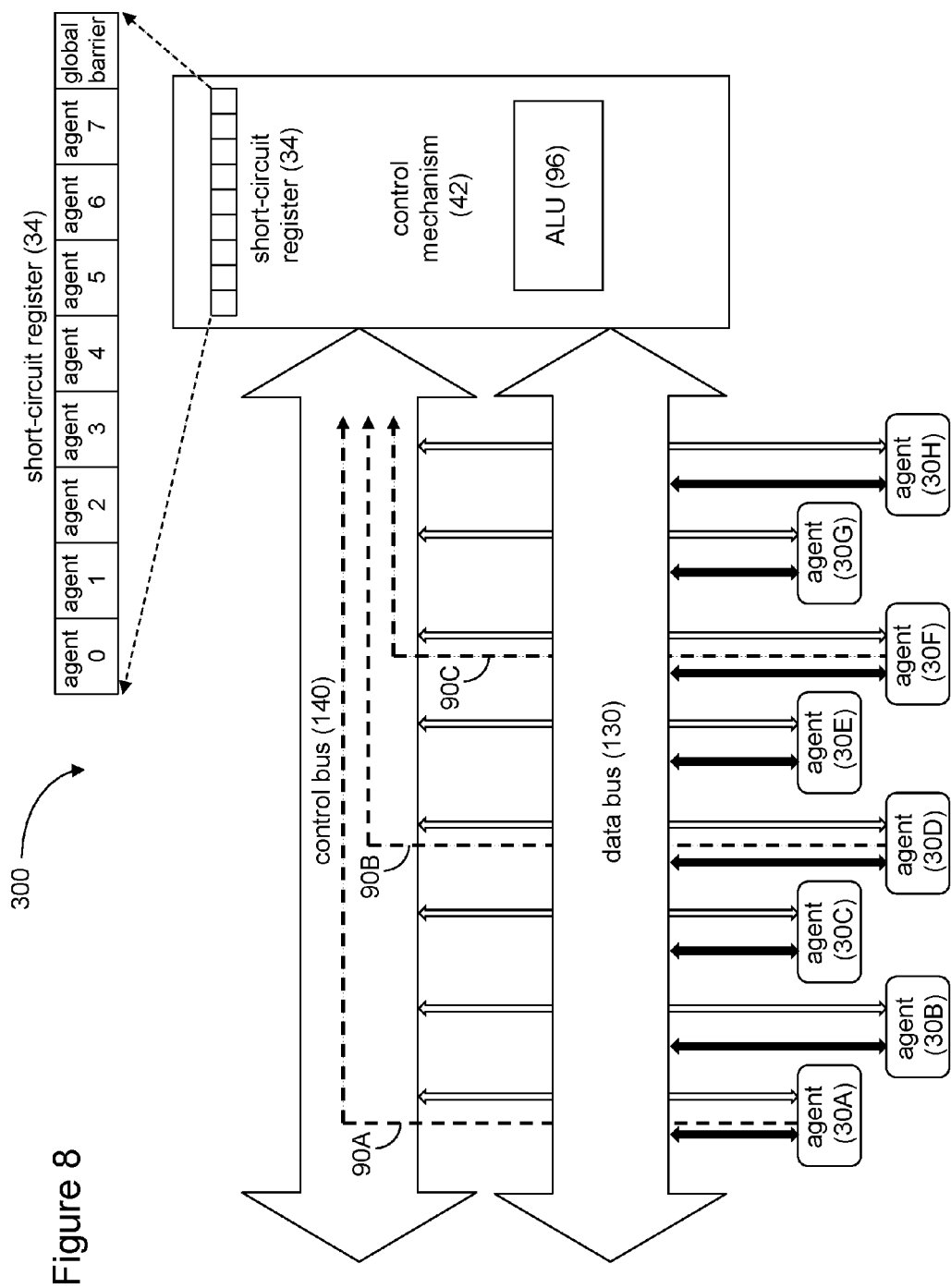
FIG. 8 is a simplified block diagram showing the BMR network of FIG. 7, including the control mechanism and bus logic, according to some embodiments.

In some embodiments, the above strategy (of using the bus for the reduction operations) is scaled to include hierarchically connected groups of agents, as illustrated in the BMR networks 300 of FIGS. 7 and 8. In this case, each control mechanism 42, whether bus arbiter or some other entity, does the local computation of the reduction operation and passes the result to the parent control mechanism's short-circuit register 34. The control mechanism 42 at the parent node computes the final result of the reduction operation and passes the values to the child bus arbiters, which then broadcast the result locally.

For reduction operations, an additional gate, which is really an arithmetic logic unit (ALU), is available as part of the control mechanism 42, in some embodiments. The reduction may be done to "find the global maximum" or "add all these numbers together" or some other purpose. The ALU on the N-wire payload network would have the ability to do these operations (max, add, min, sub, multiply, . . . ). In the BMR network 300 of FIG. 8, the control mechanism 42 includes an ALU 96 for this purpose. The ALU 96 is used to compute the results of the reduction operations on the operands.

In some embodiments, the ALU 96 is disposed at each network switch/hierarchy crossing. The ALU 96 may be built into the switch, in some embodiments. In other embodiments, the ALU 96 may reside within the nearest computing agent (processor pipeline) on the network's behalf. Using the existing data-network, the operation of the ALU 96 is pretty straightforward. If the reductions are to be performed on a limited-wire barrier network, such as the BMR network 300 (FIGS. 7, 8, and 9), either the wire count is increased, in some embodiments, or several cycles are taken to send all the bits.

This latter option is, in essence, a time-division multiplexing of the barrier wires. So, for example, if there exist four barrier wires and a 32-bit data value plus a four-bit "reduction-type" code is to be processed, nine cycles are needed to send all 36 bits down the four wires, in some embodiments.

Figure 11:
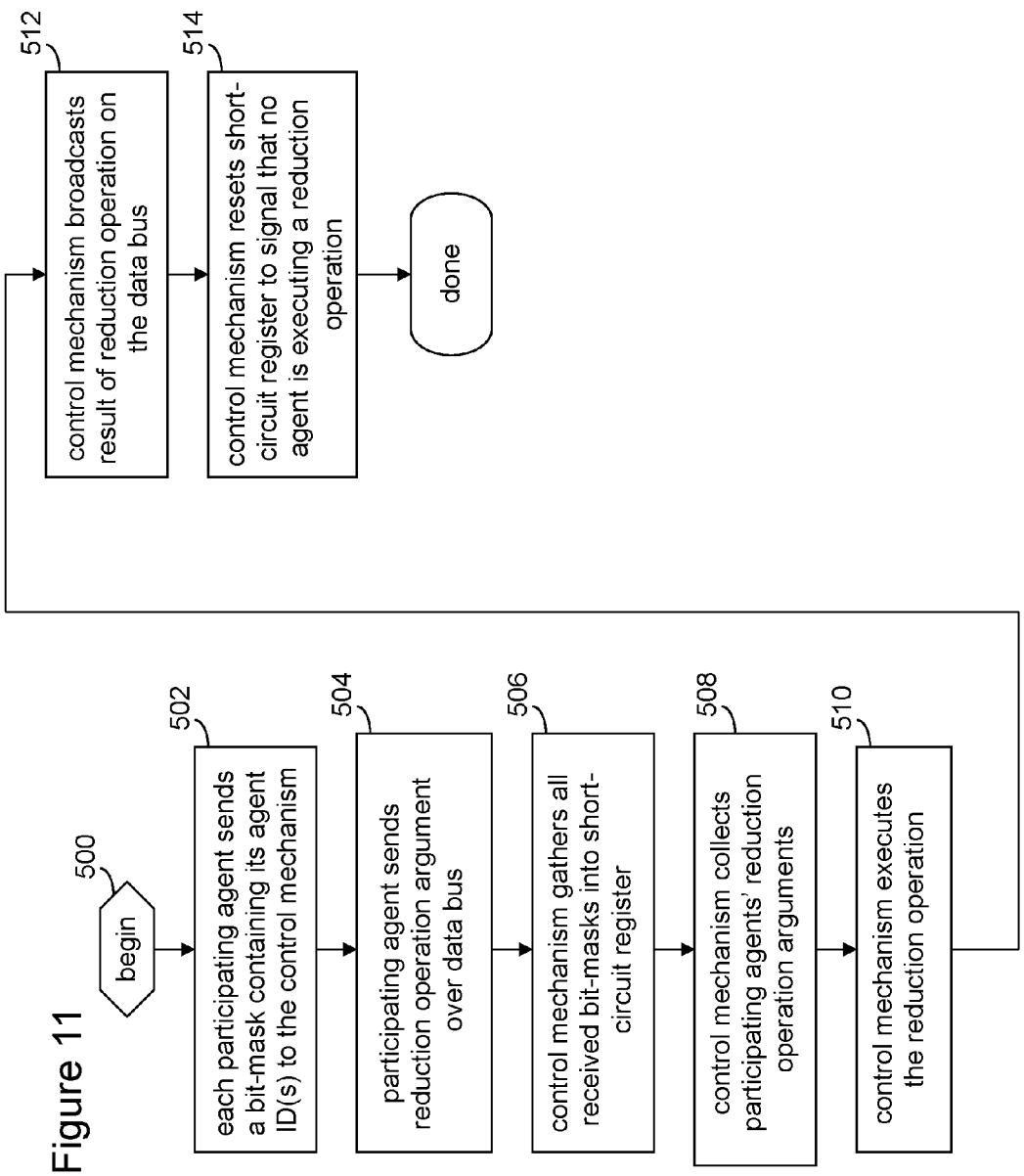
FIG. 11 is a flow diagram showing operations of the BMR network of FIG. 7 in performing reduction operations, according to some embodiments.

FIG. 11 is a flow diagram illustrating the process flow of the BMR network 300 in performing reduction operations, in some embodiments. Each participating agent 30 sends a bit-mask containing its agent ID or IDs to the control mechanism 42 (block 502). The participating agents send their reduction operation arguments over the data bus 130 (block 504). The control mechanism 42 gathers all received bit-masks into the short-circuit register 34 (block 506). The control mechanism 42 then collects the participating agents' reduction operation arguments (block 508) and executes the reduction operation (block 510). The results of the reduction operation are broadcast by the control mechanism 42 on the data bus 130 (block 512). Once the reduction operation is complete, the control mechanism 42 resets the short-circuit register 34 to signal that no agent on the bus is currently executing a reduction operation (block 514).

Multicast Operation:

Multicast operations enable the transmission of the same data to a group of agents connected through a data network. Any agent may be an initiating agent of a multicast operation. When implemented naively, the multicast operation involves the transmission of the same data to each agent, along with the destination agent ID and the address. This engenders a lot of traffic on the network, particularly if each transmission is acknowledged for resiliency purposes. Multicast support allows agents on a network to instead encode a range of agent IDs in a compact manner, the address, and the data, sending this exactly once, and relying on the network to "smartly" deliver the message to the involved targets. Multicast is used extensively for video streaming, web seminars, and the like.

Figure 12:
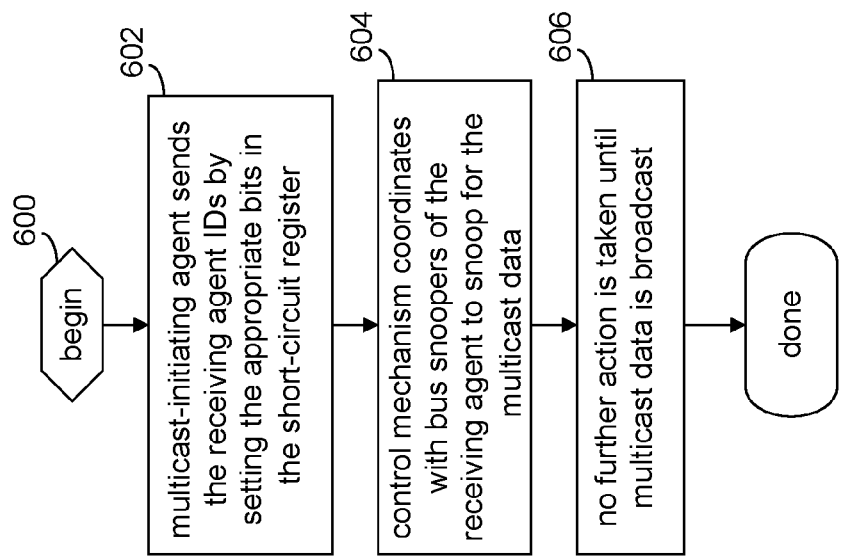
FIG. 12 is a flow diagram showing operations of the BMR network of FIG. 7 in performing multicast operations, according to some embodiments.

FIG. 12 is a simplified flow diagram illustrating the operations performed on the BMR network 300 to perform multicast operations, according to some embodiments. In some embodiments, the ALU 96 is also used for multicast operations, this time to reconstruct new networking messages on the packet payloads for multicast. For example, the next hop address and new packet length are computed by the ALU 96. The multicast initiating agent sends the receiving agent IDs by setting the appropriate bits of the short-circuit register 34 (block 602). The control mechanism 42 next coordinates with the bus snoopers of the receiving agents 30 to snoop for the multicast data that is then broadcasted on the data bus 130 (block 604). Until the multicast data is broadcast on the data bus 130, no further action is taken (block 606).

In some embodiments, the above strategy is scaled to include hierarchically connected groups of agents, as illustrated in FIG. 7. If the destination agents of the multicast operation are spread across hierarchically connected networks, then the control mechanism 42 sends the multicast message and the destination agent mask to its parent control mechanism's short-circuit register, where this operation is recursively carried out.

The above reconfigurable tree apparatus 100 thus adds to an already existing bus-based network, such as the network 200, by providing a strategy to implement synchronization operations, reduction operations, and multicast operations. The benefits of the apparatus 100 include, but are not limited to:

1. Higher performance and lower energy use than prior art software, hardware, and software/hardware operations.
2. Use of an existing bus-based implementation for network and synchronization operations. This adds less overhead for the implementation of these operations when compared to a dedicated barrier network or a reduction/multicast network. The default broadcast functionality of the bus is highly leveraged in the apparatus 100 to broadcast data in case of multicast operations and result of compute operation in case of reduction operations. This makes the apparatus 100 a low-cost/low-energy solution when compared to dedicated multicast/reduction tree networks.

3. The apparatus 100 is scalable so as to be easily used for hierarchically connected groups of agents (or cores) comprising a system.

Some prior art systems provide dedicated synchronization networks. Those with a multiplexed binary tree topology can benefit from this method.

Figure 13:
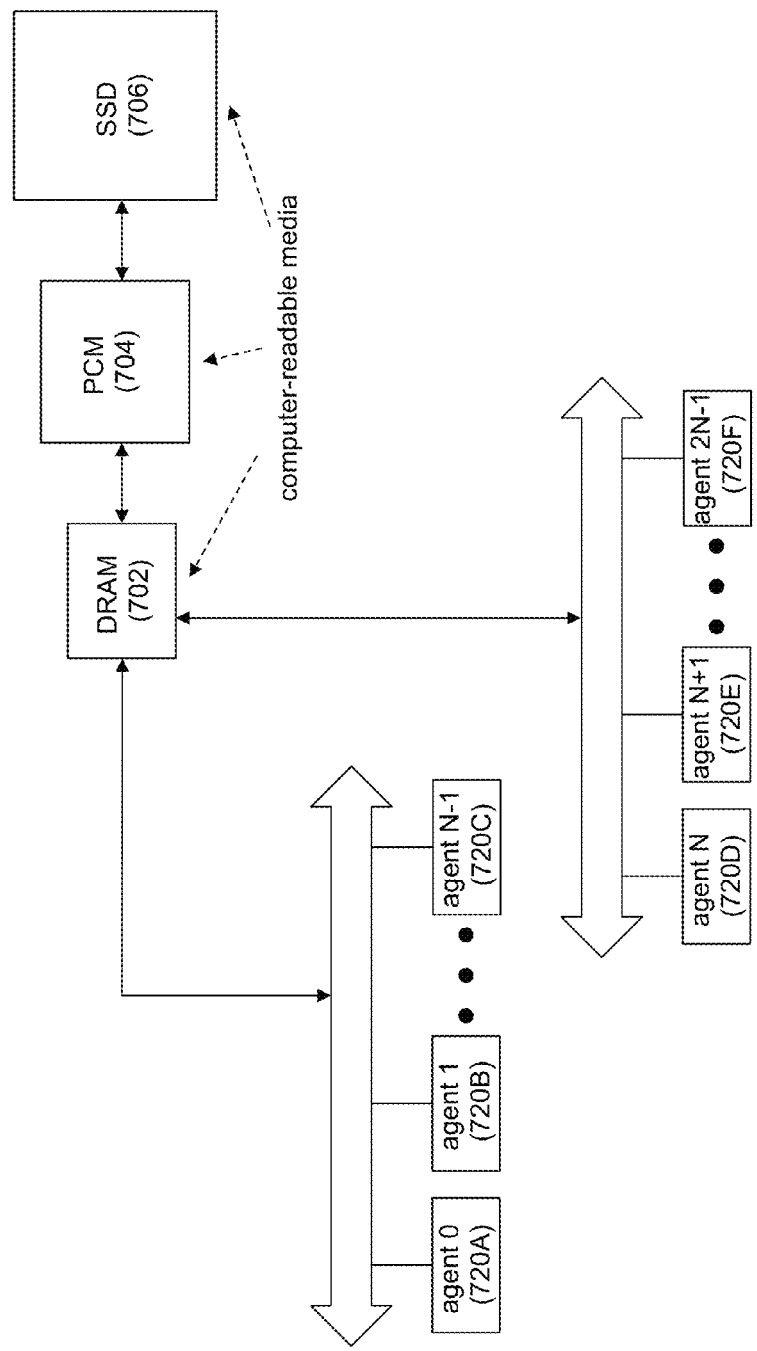
FIG. 13 is a simplified block diagram of a high-performance computing system that may operate as a BMR network, according to some embodiments.

FIG. 13 is a simplified block diagram of a high-performance computing (HPC) system 700, according to some embodiments. The HPC system 700 may embed a reconfigurable tree apparatus 100 (FIG. 1) so as to operate as a BMR network 300 (FIGS. 7, 8, and 9). In HPC systems, a computer-readable medium is a medium capable of storing data in a format readable by a computing machine. Common computer-readable media include static random access memory (SRAM), embedded dynamic random access memory (EDRAM), dynamic random access memory (DRAM) 702, magnetic memory, phase change memory (PCM) 704, solid-state drive (SSD) 706, hard drive, etc., with increasing access latency. The EDRAM is commonly an in-package technology sharing the physical package of computing elements with a separate die of DRAM, enabling the EDRAM to be closer to the processor and more efficient in use. The computer-readable media are extended in a hierarchical hybrid memory organization. FIG. 13 illustrates one representative extended view of the computer-readable media, with regards of the execution engines (XEs) and computing engines (CEs) shown as agents (720).

A software program is stored in the computer-readable medium, such as DRAM 702, PCM 704, or SDD 706. The software is able to initiate BMR operations such as a barrier instruction in the HPC system 700, where the barrier instruction indicates a barrier operation to be performed between one or more agents. The software initiates the BMR operation by using software instructions (such as "barrier start" and "barrier wait") that trigger the previously described state machine mechanisms to provide the requested behavior, in this example a barrier. In this example, once the barrier instruction is ready for retirement, further execution is delayed within the computing agent until the BMR state machines have determined that all participating agents have met the barrier conditions, and a result signal is propagated by the BMR state machines to each participating agent. This BMR state machine result signal indicates that the conditions of the barrier operation have been met. This allows the BMR operation, here a barrier wait operation, to finally retire and for program execution to resume normally. The software at this may modify any short-circuit registerts to alter which agents are participating in future BMR operations. In some embodiments, the software may also explicitly set or unset additional flags to indicate whether a BMR operation is in progress, enabling succeeding barrier operations to commence.

In summary, the reconfigurable tree apparatus 100 provides a very simple reconfigurable tree structure for some classes of operations, which can then be applied across all possible uses. The proposed apparatus 100 can be used for integrating memory, network, and computation on a platform consisting of a shared bus or switch or a combination of both bus and switch, which can be built into mainstream servers, clients, system-on-chip, high-performance computing, and data center platforms. The reconfigurable tree apparatus 100 can significantly reduce platform energy consumptions by reusing existing bus/switch logic for collaborative compute operations.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A reconfigurable logical tree apparatus to be implemented in a multiple-agent network regardless of physical topology, the reconfigurable tree comprising:
   a plurality of support circuits, each support circuit to couple to an associated block of the multiple-agent network, the multiple-agent network comprising a plurality of blocks arranged in a tree hierarchy, each block comprising one or more agents, each support circuit of the plurality of support circuits comprising:
      an N-input bypass circuit, wherein N is the number of agents in the block associated with the support circuit, the N-input bypass circuit to generate a global output signal, wherein the global output signal is to be transmitted to a parent block of the block, the N-input bypass circuit further comprising:
         a short-circuit register comprising:
            N fields, one associated with each agent; and
            a short-circuit field; and
         combinational logic to receive:
            N first inputs, one from each agent; and
            N+1 second inputs, N of the second inputs to be received from each of the N agent fields and one of the second inputs being received from the short-circuit register field;
         the combinational logic to generate:
            a first output signal and a second output signal, both of which are to be fed back to each of the N agents, the first output signal to indicate satisfaction of a global barrier/multicast/reduction (BMR) operation and the second output signal to enable participation in a local BMR operation by the N agents within the support circuit.

2. The reconfigurable tree apparatus of claim 1, the combinational logic further to:
   receive a control engine input from a control engine; and
   generate a third output signal to be fed back into the control engine;
wherein the control engine optionally participates in a local or global BMR operation.

3. The reconfigurable tree apparatus of claim 2, wherein the combinational logic is substantially bypassed by setting the short-circuit field of the short-circuit register to generate the global output signal.

4. The reconfigurable tree apparatus of claim 3, further comprising:
   a control signal to be received from a control mechanism, wherein the control mechanism sets or resets one or more fields of the short-circuit register.

5. The reconfigurable tree apparatus of claim 4, wherein the control mechanism is part of the multiple-agent network.

6. A barrier, multicast, and reduction (BMR) network, comprising:
   a computing system comprising a plurality of blocks arranged in a tree hierarchy, each block comprising two or more agents, the computing system further comprising a control bus and a data bus;
   a reconfigurable tree apparatus coupled to the computing system, the reconfigurable tree apparatus comprising:
      a plurality of support circuits, each support circuit to couple to an associated block of the computing system, each support circuit of the plurality of support circuits comprising:

an N-input bypass circuit to generate a global output signal to be transmitted to a parent block of the block, wherein N is the number of agents in the block associated with the support circuit, the N-input bypass circuit further comprising:
- a short-circuit register comprising one field for each agent and one short-circuit field;
- combinational logic to receive N signals, one from each agent, and N+1 second signals, one from each field of the short-circuit register, the combinational logic to generate two signals to each be fed back to the agents;

wherein the BMR network executes a barrier instruction, a muticast operation, or a reduction operation between participating agents of the computing system.

7. The BMR network of claim 6, the combinational logic further to:
receive a control engine input from a control engine; and
generate a third signal to be fed back into the control engine.

8. The BMR network of claim 7, wherein the combinational logic is bypassed by setting the short-circuit field of the short-circuit register to generate the global output signal wherein communication between the control mechanism and the agents occurs via the control bus.

9. The BMR network of claim 8, wherein the control mechanism:
receives a bit-mask containing agent identifier information from each agent participating in a barrier operation;
updates the short-circuit register based on the received bit-masks;
obtains a signal from each agent participating in the barrier operation once the program-defined synchronization point has been reached for each agent;
sends a barrier complete signal to indicate that all conditions of the barrier operation have been met.

10. The BMR network of claim 9, wherein the control mechanism:
resets the short-circuit register to signal that no agent on the bus is currently executing a barrier operation.

11. The BMR network of claim 6, wherein the barrier instruction is a software program executed by an agent of the computing system.

12. The BMR network of claim 9, wherein two tree segments of the BMR network see the barrier complete signal at different times, but all agents within a given block of the BMR network see the barrier complete signal at the same time.

13. The BMR network of claim 8, further comprising:
a data bus coupled between the agents and the control mechanism.

14. The BMR network of claim 13, further comprising:
an arithmetic logic unit.

15. The BMR network of claim 14, wherein the control mechanism:
receives a bit-mask containing agent identifier information from each agent participating in a reduction operation;
updates the short-circuit register based on the received bit-masks;
receives a plurality of reduction operation arguments from agents participating in a reduction operation, wherein the participating agents are a subset of all agents in the computing system, each reduction operation argument to be transmitted as a payload over the data bus;
executes the specified reduction operation using the received payloads with the arithmetic logic unit, resulting in a reduction operation result; and
broadcasts the reduction operation result as a new payload over the data bus.

16. The BMR network of claim 14, wherein the control mechanism:
identifies multicast operation receiving agents by reading the short-circuit register;
transmits a multicast payload onto the data bus using the arithmetic logic unit for receipt by the multicast operation receiving agents; and
coordinates with bus snoopers of each receiving agent to snoop for multicast data on the data bus.

17. The BMR network of claim 6, wherein two tree segments of the BMR network see the barrier output signal at different times, but all agents within a given block see the barrier output signal at the same time.

18. A method to perform a barrier operation in a multiple-agent network, the method comprising:
receiving, by a control mechanism, a plurality of bitmasks from a plurality of participating agents, each bitmask comprising an agent identifier from respective participating agents in the multiple-agent network, wherein the multiple-agent network comprises a hierarchical collective network comprising a plurality of support circuits, each support circuit further comprising at least two agents and an N-input bypass circuit, where N is the number of agents in the respective support circuit, wherein each bypass circuit comprises its own short-circuit register, wherein the control mechanism stores the bitmasks in one or more short-circuit registers associated with the respective participating agents;
receiving, by the control mechanism, a plurality of signals, one signal from each of the plurality of participating agents, wherein, for each participating agent, the signal is not to be transmitted to the control mechanism until a program-defined synchronization point is reached; and
signaling, by the control mechanism, that the conditions of the barrier have been met.

19. The method of claim 18, further comprising:
resetting, by the control mechanism, the short-circuit register, wherein the short-circuit register, when reset, indicates that no agent in the multiple-agent network is currently executing a barrier operation.

20. The method of claim 19, wherein each agent of the multiple-agent network independently reaches its program-defined synchronization point.

21. The method of claim 19, wherein the plurality of signals is asynchronously received from each participating agent by the control mechanism.

* * * * *